United States Patent [19]

Poninski

[11] Patent Number: 4,672,295
[45] Date of Patent: Jun. 9, 1987

[54] BATTERY CHARGER CIRCUIT

[75] Inventor: Carl L. Poninski, Florissant, Mo.

[73] Assignee: Motor Appliance Corporation, Chesterfield, Mo.

[21] Appl. No.: 761,377

[22] Filed: Aug. 1, 1985

[51] Int. Cl.⁴ .............................................. H02J 7/00
[52] U.S. Cl. ............................................ 320/23; 320/37
[58] Field of Search ................. 320/37, 38, 22, 23, 320/24

[56] References Cited

U.S. PATENT DOCUMENTS

| | | | |
|---|---|---|---|
| 2,431,312 | 11/1947 | Cronvall | 320/22 |
| 2,875,396 | 2/1959 | Christie et al. | 321/19 |
| 3,090,904 | 5/1963 | Jensen | 320/22 |
| 3,193,750 | 7/1965 | Chait | 320/22 |
| 3,217,228 | 11/1965 | Jardine | 320/53 |
| 3,278,823 | 10/1966 | Ross | 320/23 |
| 3,659,181 | 4/1972 | Bembenek | 320/22 |
| 3,843,918 | 10/1974 | Rhyne | 320/23 |
| 4,045,717 | 8/1977 | Fallon et al. | 320/23 X |
| 4,233,553 | 11/1980 | Prince, Jr. et al. | 320/23 |
| 4,313,078 | 1/1982 | Bilsky et al. | 320/15 |
| 4,460,863 | 7/1984 | Conforti | 320/59 |

Primary Examiner—Patrick R. Salce
Assistant Examiner—Anita M. Ault
Attorney, Agent, or Firm—Rogers, Howell, Moore & Haferkamp

[57] ABSTRACT

A battery charger circuit having a main transformer and a boost transformer. The main transformer supplies power to produce a DC main charging current at the circuit output for charging a battery. The boost transformer supplies power to produce a DC trickle charging current at the circuit output. The power rating of the boost transformer is a small percentage of that of the main transformer.

21 Claims, 4 Drawing Figures

BATTERY CHARGER CIRCUIT

BACKGROUND AND SUMMARY OF THE INVENTION

This invention relates to a battery charging circuit, and more particularly to such a circuit where two transformers are used, one being a main transformer for supplying main charging current, and the other being a boost transformer for supplying trickle charge current. The advantages of the invention are both economy and efficiency, allowing the use in an efficient manner of standard transformers that are mass produced.

Battery charging circuits including multiple transformers, or transformers having multiple secondary windings, are well known.

Cronvall U.S. Pat. No. 2,431,312 discloses a charging circuit using choke coils to control the charging current produced by the transformer 2. In Cronvall there does not appear to be a separate transformer supplying trickle charge to the battery.

Jensen U.S. Pat. No. 3,090,904 discloses a battery charging circuit where the coils 31 and 32 supply the charge current. After a certain time has elapsed, a timer closes a switch to place capacitance in the resonant circuit to increase the charge voltage near the end of the charge cycle to provide "gassing" of the battery.

Chait U.S. Pat. No. 3,193,750 discloses the use of two transformers. The transformer 52 establishes a control voltage such that when the battery voltage exceeds the control voltage, the transformer 12 supplies a trickle charge through a variable resistor. Chait does not use a separate boost transformer for supplying the trickle charge.

Conforti U.S. Pat. No. 4,460,863 provides a trickle charge through an LED and resistor, but not from a separate transformer.

Rhyne U.S. Pat. No. 3,843,918, and Jardine U.S. Pat. No. 3,217,228 are further examples of battery chargers using a single transformer with multiple secondary windings and resistance in the secondary to limit the charging current. Other examples of known battery charger circuits are disclosed in U.S. Pat. Nos. 2,875,396, 3,278,823, 3,659,181, 4,233,553, and 4,313,078.

The major advantages of the present invention over the prior art are economy and efficiency. Generally, the present invention utilizes two transformers. One is the main transformer supplying power to produce the main charging current for charging the battery. The second is a boost transformer for supplying the trickle charge. Preferably, the main transformer is of a center tap, ferro-resonant type, and the boost transformer is of high impedance. Initially, as the battery is being charged, the main transformer supplies nearly all of the power for charging the battery, the boost transformer supplying only a very small percentage of the power, for example, about 3%. As the battery is charged to its rated voltage, less power is supplied from the main transformer, so that an increasingly higher percentage of power is supplied from the boost transformer. Once the battery reaches rated voltage, the battery continues to be trickle charged with greater power from the boost transformer and with very little power supplied from the main transformer.

Hence, the battery charger circuit of this invention allows efficient use of standard transformers that are mass produced. The main and boost transformers are of standard type, so it is not necessary to manufacture a special transformer for a particular charging requirement. For example, such special transformers might require specified numbers of windings or taps in the secondary that are nonstandard. Such special purpose transformers are expensive to manufacture. The battery charger circuit of the present invention is also efficient in the use of a high impedance boost transformer to supply the trickle charge without requiring resistance as the primary means for limiting the current as with some prior art battery charging circuits. Such resistance dissipates power and provides low efficiency. By using a boost transformer with high reactive impedance, the amount of energy lost by use of limiting resistors is much reduced. This is true even where some resistance is used in the secondary, because the current in the secondary is small due to the high transformer reactive impedance.

The boost transformer and its associated circuitry can also be used as a retrofit kit for existing chargers for supplying trickle charge. The booster kit itself has a low VA rating, and is therefore relatively inexpensive for the purpose of supplying trickle charge.

These and other advantages of the invention are apparent from the drawing and detailed description to follow.

DETAILED DESCRIPTION OF PREFERRED EMBODIMENTS

Figure 1:
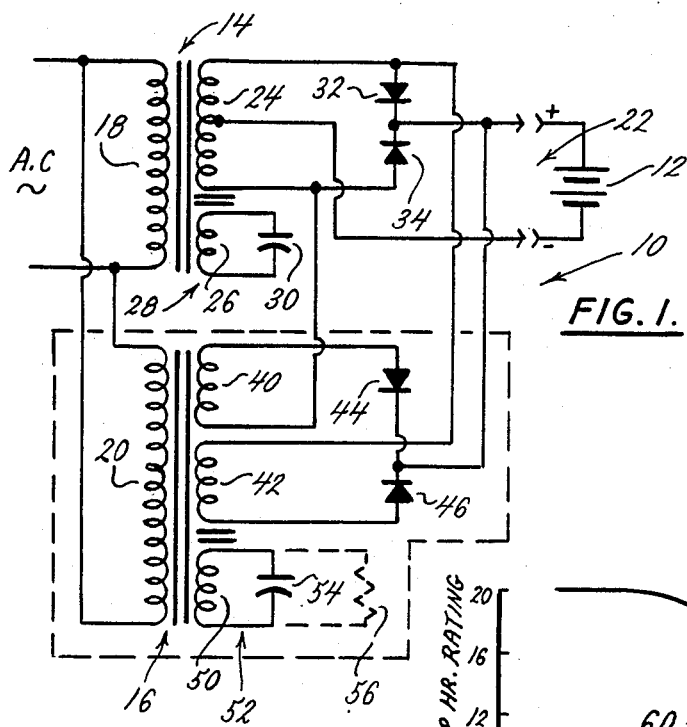
FIG. 1 is an electrical schematic diagram of one embodiment of the battery charging circuit of this invention.

With particular reference to FIG. 1 of the drawing, there is shown a battery charging circuit 10 for charging a battery 12. The circuit includes a main transformer 14 and a boost transformer 16, these being separate transformers connected in the circuit as shown. The primary windings 18 and 20 of the transformers are connected in parallel to an AC power source. The main transformer 14 is of a relatively high power rating for supplying power to the circuit to produce at the circuit output 22 the main DC charging current to charge the battery to its rated voltage. The main transformer 14 is of the center tap, ferro-resonant type, such that it has a secondary center tap winding 24, and another secondary winding 26 which is part of a ferro-resonant circuit 28 also including a capacitor 30. The sides of the winding 24 are connected through diodes 32 and 34 to the positive side of the output 22. The center tap is connected to the negative side of the output.

Hence the main transformer 14 and associated network including the diodes 32 and 34 constitute a full wave rectifier producing DC charging current at the output 22 to charge the battery.

The boost transformer 16 is preferably a high impedance transformer with a power rating substantially less than that of the main transformer. The boost transformer has secondary coils 40 and 42. One side of the coil 40 is connected through a diode 44 to the positive side of the output 22, and the other side of the coil is connected through the diode 34 to the positive side of the output. One side of the coil 42 is connected through a diode 46 to the positive side of the output, and the other side of the coil 42 is connected through the diode 32 to the positive side of the output. The boost transformer 16 also has a secondary coil 50 which is part of a ferro-resonant circuit 52 which also may include either a capacitor 54, or in the alternative a resistor 56.

The purpose of the boost transformer 16 is to continue to supply low charging currents, or trickle charge, to the battery after the battery has been charged to its rated voltage with power from the main transformer. Hence, the secondary windings 40 and 42, and their associated network, including the diodes 44, 46, 32, and 34, constitute a full wave rectifier for supplying DC trickle charge current at the circuit output.

With this embodiment, the boost transformer 16 is also of the ferro-resonant type as indicated by the ferro-resonant circuit 52. With reference to the graph of FIG. 2, the shape of the curve in the sloping area 60 can be adjusted by selection of the capacitance 30 in the ferro-resonant circuit 28 of the main transformer. The shape of the tail 62 of the curve can be adjusted by selection of the capacitance 54, or in the alternative the resistor 56, in the ferro-resonant circuit 52 of the boost transformer. The greater the capacitance 54 the greater the trickle current, and the greater the resistance 56 the smaller the trickle current.

Figure 3:
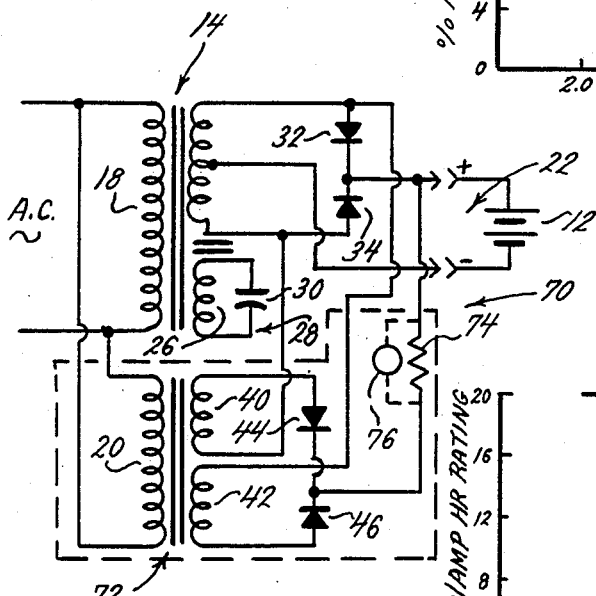
FIG. 3 is an electrical schematic diagram of another embodiment of the battery charger circuit of this invention.
Figure 4:
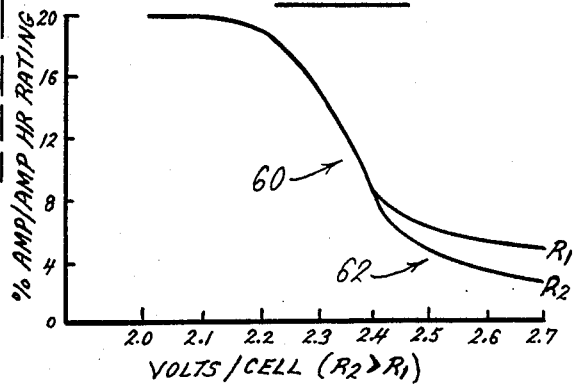
FIG. 4 is a graph showing the relationship between the percent amps per amp hour rating versus volts per cell of a battery being charged, and showing the variations in the tail of the curve representing trickle charge of the battery with changes in value of certain resistance in the circuit of FIG. 3.

In FIG. 3 there is shown another embodiment 70 of this invention which in many respects is the same as the embodiment of FIG. 1, but with the following exceptions. The boost transformer 72 is not of the ferro-resonant type, and therefore does not include a ferro-resonant circuit as with the boost transformer 16. Instead, the shape of the tail 62 of the curve shown in FIG. 4 is determined by a resistor 74 between the diode 46 and the positive side of the output 22. In the place of the resistor 74, a series regulator 76, of any suitable type known in the art, may be used. With reference to the curve of FIG. 4, the greater the resistor 74, the less the trickle current. With a suitable series regulator, it is also possible to adjust the amount of current and the shape of the tail of the curve.

Figure 2:
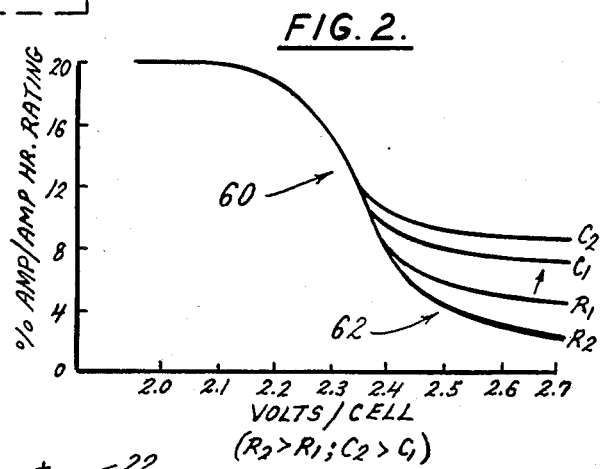
FIG. 2 is a graph showing the relationship between the percent amps per amp hour rating versus volts per cell of a battery being charged, and showing the variations in the tail of the curve representing trickle charge of the battery with changes in value of certain capacitance and resistance in the circuit of FIG. 1.

With both embodiments, the main transformer 14 is of a relatively high power rating and supplies power to produce the main DC charging current for the battery as the battery is being charged up to its rated voltage. The boost transformer of each embodiment is a high impedance, relatively low power, transformer so that the charging current supplied from the boost transformer is relatively small. Although the boost transformer always acts to supply some charge, it is a small percentage of the total while the battery is initially charging. As the battery voltage gets closer to rated voltage, the charge current supplied from the main transformer diminishes so that a greater percentage of the charge current is supplied from the boost transformer. After the battery is charged to rated voltage, the boost transformer continues to supply trickle charging current to the battery as shown by the graphs of FIGS. 2 and 4.

By way of example, the power rating of the boost transformer may be only about three percent of that of the main transformer and may initially contribute very little of the charging current as the battery is being charged. Also by way of example, if the battery being charged is 24 volts, the main transformer may be rated at 24 volts, 150 amps (3.6 KVA), and the boost transformer may be rated at 6 volts, 20 amps (120 VA).

Both the main and boost transformers are standard types which are commonly produced. Moreover, the boost transformer being of relatively low power provides an inexpensive means for supplying trickle charge. High efficiency is achieved with the use of a high impedance transformer to supply the trickle charge rather than using resistance as the primary means for limiting the current.

In addition to including the entire circuit of either embodiment in a battery charger unit, it is also possible with either embodiment to provide the boost transformer and associated circuitry as a separate kit as a retrofit for connection to a main charger to supply the trickle charge. The kits are shown by the portions of the circuits 10 and 70 within the dashed lines. The kits represent an inexpensive means for providing trickle charge capability to a main charger due to the inexpensive, high efficiency components.

While a single-phase circuit is shown, it is to be understood that the principles of this invention including the use of a separate boost transformer to provide trickle charge are also applicable to multi-phase applications.

There are various changes and modifications which may be made to applicant's invention as would be apparent to those skilled in the art. However, these changes or modifications are included in the teaching of applicant's disclosure, and it is intended that the invention be limited only by the scope of the claims appended hereto.

I claim:

1. A battery charger circuit comprising at least one main transformer and at least one boost transformer, said main transformer supplying power to produce a DC main charging current at a circuit output for charging a battery, said boost transformer supplying power to produce a DC trickle charging current at the circuit output, the power rating of said boost transformer being a small percentage of that of the main transformer, said main and boost transformers having outputs connected through a parallel circuit for charging the battery.

2. The battery charger circuit of claim 1 further comprising means for supplying said trickle charging current with the main charging current, the ratio of trickle charging current to main charging current increasing as the battery charges, and means for continuing to supply said trickle charging current to said battery after the battery is charged to rated voltage.

3. The battery charger of claim 1 wherein said main transformer is of the center tap type, and there is further included an associated network to provide full wave DC main charging current.

4. The battery charger circuit of claim 3 wherein said main transformer is of the ferro-resonant type.

5. The battery charger circuit of claim 1 wherein said boost transformer is of a high impedance as compared to the main transformer.

6. The battery charger circuit of claim 5 wherein said boost transformer has multiple output windings connected through a diode network to produce a full wave rectified DC trickle current.

7. The battery charger circuit of claim 5 wherein said boost transformer is of the ferro-resonant type, and where the output current of the boost transformer is limited by the amount of capacitance in the resonant circuit of the boost transformer.

8. The battery charger circuit of claim 5 wherein said boost transformer is of the ferro-resonant type, and where the output current of the boost transformer is limited by the amount of resistance in the resonant circuit of the boost transformer.

9. The battery charger circuit of claim 5 further comprising a resistance in series between one side of a secondary winding of the boost transformer and the positive side of the circuit output to limit the trickle current.

10. The battery charging circuit of claim 5 further comprising a series regulator between one side of a secondary winding of the boost transformer and the positive side of the circuit output to limit the trickle current.

11. A battery charger circuit comprising at least one main transformer and at least one boost transformer, the main transformer being of a center tap type, a network associated with the main transformer to provide full wave DC main charging current to a battery at the output of the charging circuit, said boost transformer being of high impedance and low power rating compared to the main transformer, said boost transformer supplying power to produce a DC trickle charging current at the circuit output, said trickle charging current being supplied with the main charging current, the ratio of trickle charging current to the main charging current increasing as the battery charges, and said trickle charging current continuing to be supplied to said battery after the battery is charged to rated voltage.

12. The battery charger of claim 11 wherein the main transformer is of the ferro-resonant type.

13. The battery charging circuit of claim 12 wherein the boost transformer is of the ferro-resonant type.

14. The battery charger of claim 12 wherein the boost transformer has cultiple output winding connected through a diode network to produce a full wave rectified DC trickle current, said diode network included in a parallel circuit for charging the battery.

15. A battery trickle charger for connection to a main charger circuit to supply trickle charge to a battery, said main charger circuit including at least one main transformer and associated network for supplying power to produce a Dc main charging current at its output, said trickle charger comprising: at lest one boost transformer supplying power to produce a DC trickle charging current at said output, the power rating of said boost transformer being a small percentage of that of the main transforer, and means for connecting said trickle charger to a main charger circuit to supply trickle charge to the battery with the main and boost transformers having outputs connected through a parallel circuit for charging the battery.

16. The battery trickle charger of claim 15, wherein the boost transformer is of a high impedance as compared to the main transformer.

17. The battery trickle charger of claim 16 wherein said boost transformer has multiple output windings connected through a diode network to produce a full wave rectified DC trickle current.

18. The battery trickle charger of claim 16 wherein said boost transformer is of the ferro-resonant type, the output current of the boost transformer being limited by the amount of capacitance in the resonant circuit of the boost transformer.

19. The battery trickle charger of claim 16 wherein said boost transformer is of the ferro-resonant type, the output current of the boost transformer being limited by the amount of resistance in the resonant circuit of the boost transformer.

20. The battery trickle charger of claim 16 further comprising a resistance at one side of a secondary winding of the boost transformer for limiting the trickle current.

21. The battery trickle charger of claim 16 further comprising a series regulator at one side of a secondary winding of the boost transformer for limiting the amount of trickle current.

* * * * *